US008974758B2

United States Patent
Ertan et al.

(10) Patent No.: US 8,974,758 B2
(45) Date of Patent: Mar. 10, 2015

(54) METHODS OF PURIFYING COS

(75) Inventors: Asli Ertan, Istanbul (TR); Nathan Stafford, Damascus, OR (US); Christian Dussarrat, Wilmington, DE (US); Dmitri Znamensky, West Chester, PA (US)

(73) Assignee: American Air Liquide, Inc., Fremont, CA (US)

( * ) Notice: Subject to any disclaimer, the term of this patent is extended or adjusted under 35 U.S.C. 154(b) by 440 days.

(21) Appl. No.: 13/319,281

(22) PCT Filed: Apr. 30, 2010

(86) PCT No.: PCT/US2010/033209
§ 371 (c)(1),
(2), (4) Date: Nov. 7, 2011

(87) PCT Pub. No.: WO2010/129421
PCT Pub. Date: Nov. 11, 2010

(65) Prior Publication Data
US 2012/0051995 A1    Mar. 1, 2012

Related U.S. Application Data

(60) Provisional application No. 61/176,309, filed on May 7, 2009.

(51) Int. Cl.
| | |
|---|---|
| *B01D 53/52* | (2006.01) |
| *B01J 20/28* | (2006.01) |
| *B01J 20/18* | (2006.01) |
| *C01B 17/04* | (2006.01) |
| *B01D 53/02* | (2006.01) |
| *B01J 20/02* | (2006.01) |

(52) U.S. Cl.
CPC ........... *B01D 53/02* (2013.01); *B01J 20/28052* (2013.01); *B01D 2253/112* (2013.01); *B01D 2257/30* (2013.01); *B01J 2220/42* (2013.01); *B01D 2259/4143* (2013.01); *B01J 20/18* (2013.01); *B01D 2257/504* (2013.01); *B01D 2257/80* (2013.01); *Y02C 10/08* (2013.01); *C01B 17/0408* (2013.01); *B01J 20/0244* (2013.01); *B01D 2253/108* (2013.01); *B01D 2257/304* (2013.01); *B01J 2220/56* (2013.01); *B01D 2259/4145* (2013.01)
USPC ............................. 423/230; 95/136; 423/416

(58) Field of Classification Search
USPC ..................... 95/136; 423/230, 416
See application file for complete search history.

(56) References Cited

U.S. PATENT DOCUMENTS

| | | | |
|---|---|---|---|
| 3,409,399 A | 11/1968 | Bertozzi et al. | |
| 3,432,266 A | 3/1969 | Garlet et al. | |
| 3,764,661 A | 10/1973 | Kanazawa et al. | |
| 3,856,925 A | 12/1974 | Kodera et al. | |
| 4,078,045 A | 3/1978 | Nakayama et al. | |
| 4,224,300 A | 9/1980 | Takahashi et al. | |
| 4,250,156 A | 2/1981 | Takahashi et al. | |
| 4,500,505 A | 2/1985 | Jevnikar et al. | |
| 4,522,793 A | 6/1985 | Larson et al. | |
| 4,735,788 A | 4/1988 | Voirin | |
| 5,376,228 A | 12/1994 | Yanagida | |
| 7,846,325 B2 * | 12/2010 | Van Hardeveld et al. | ..... 208/247 |
| 2006/0140852 A1 | 6/2006 | Russell et al. | |
| 2008/0078292 A1 | 4/2008 | Mimura et al. | |

FOREIGN PATENT DOCUMENTS

FR       2 916 149      11/2008
WO    WO 02 24326      3/2002

OTHER PUBLICATIONS

Lee, S.C. et al., "Kinetics of removal of carbonyl sulfide by aqueous monoethanolamine," Environ. Sci. Technol. 35 (2001), pp. 3452-2357.
Mandal, B.P. et al., "Absorption of carbon dioxide into aqueous blends of 1-amino-2-methyl-1-propanol and monoethanolamine," Chemical Engineering Science 61 (2006), pp. 5440-5447.
Miura, K. et al., "Simultaneous removal of COS and $H_2S$ from coke oven gas a low temperature by use of an iron oxide," Ind. Eng. Chem. Res. 31 (1992), pp. 415-419.
Ter Matt, H. et al., "The removal of hydrogen sulfide from gas streams using an aqueous metal sulfate absorbent. Part I. The absorption of hydrogen sulfide in metal sulfate solutions," Separation and Purification Technology 43 (2005), pp. 183-197.
Wang, X. et al., "Chemisorption of hydrogen sulphide on zinc oxide modified aluminum-substituted SBA-15," Applied Surface Science 254 (2008), pp. 5445-5451.
Wang, X. et al., "Mesoporous SBA-15 supported iron oxide: a potent catalyst for hydrogen sulfide removal," Water Air Soil Pollut 193 (2000), pp. 247-257.
Carbonyl Sulfide COS, {http://www.americanelements.com/cedly.html}, Apr. 30, 2010.
Carbonyl sulfide COS, {http://www.tradekey.com/product_view/id/982885.htm}, Apr. 30, 2010.
International Search Report and Written Opinion for corresponding PCT/US2010/033209, Aug. 16, 2010.

* cited by examiner

*Primary Examiner* — Stuart Hendrickson
(74) *Attorney, Agent, or Firm* — Patricia E. McQueeney

(57) ABSTRACT

Disclosed is a process to purify COS and remove $H_2S$ without hydrolyzing or trapping the desired COS product.

20 Claims, 3 Drawing Sheets

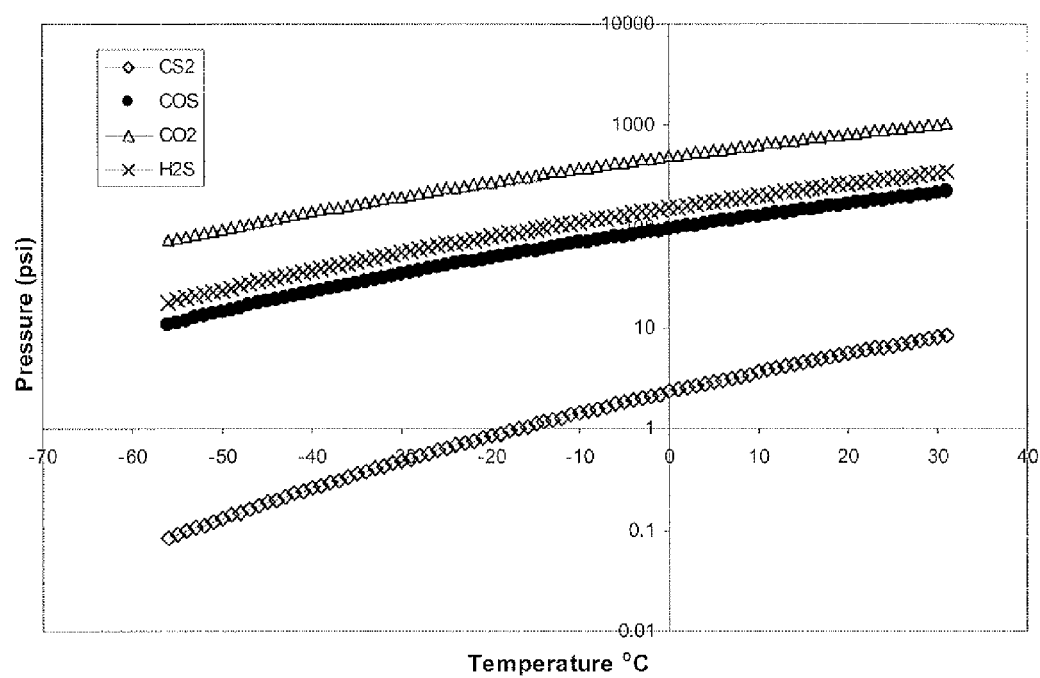
Figure 1. Vapor pressure versus temperature curve for the gases involved in the process

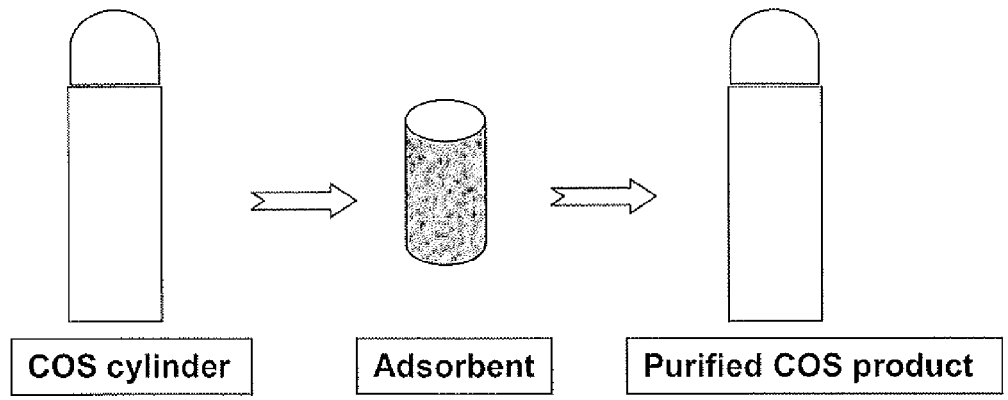
Figure 2A. First embodiment
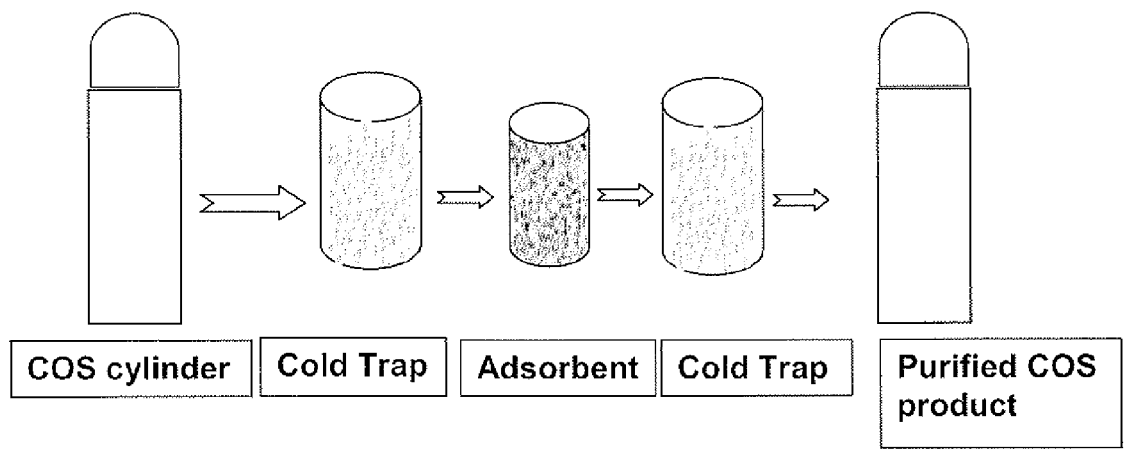
Figure 2B. Second embodiment

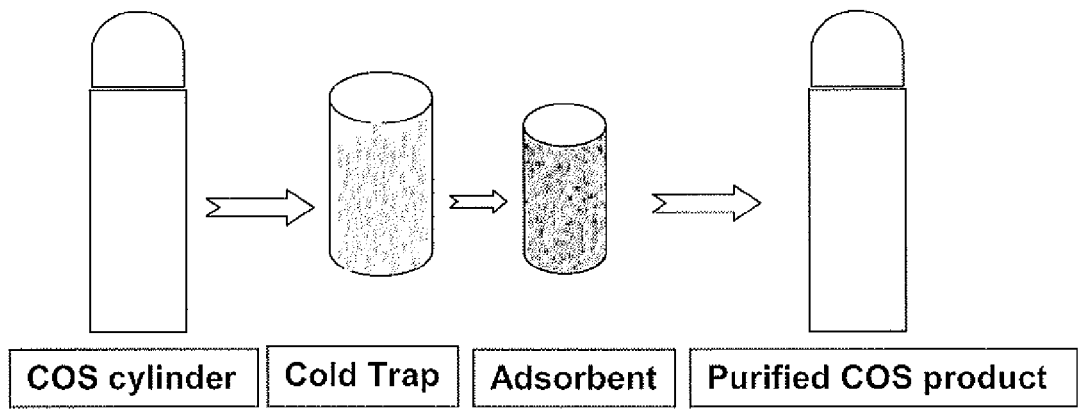
Figure 2C. Third embodiment
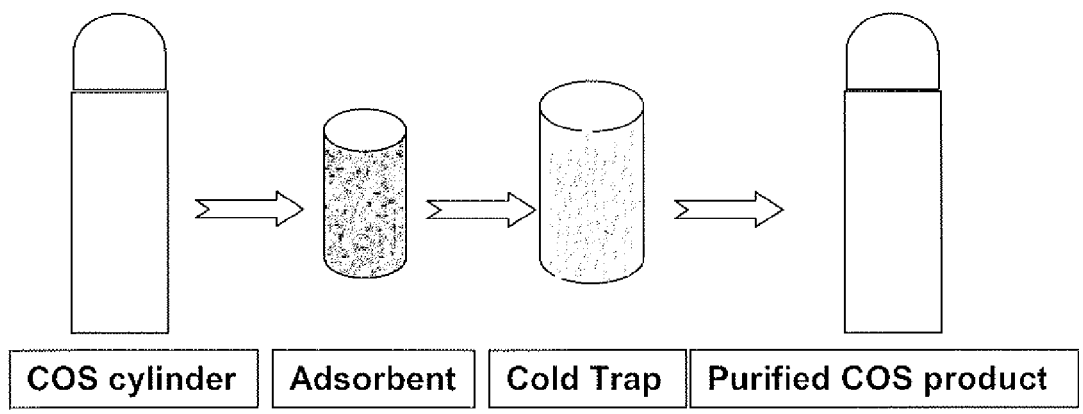
Figure 2D. Fourth embodiment

METHODS OF PURIFYING COS

CROSS REFERENCE TO RELATED APPLICATIONS

This application is a 371 of International PCT Application PCT/US2010/033209, filed Apr. 30, 2010, which claims priority to U.S. Provisional Application 61/176,309, filed May 7, 2009, the entire contents of which are incorporated herein by reference.

BACKGROUND

Patterning of wafers is a key process for producing a semiconductor device. As device geometries get smaller, processes such as dry plasma etching will see more usage. Also, with the introduction of new materials comes a requirement for more advanced and new etching gases and mixtures. The above need has been further underlined recently due to the increasing interest in 3-D integration. While two silicon surfaces may be aligned face-to-face, integration of more than 2 circuit levels requires Through-Silicon-Vias (TSV). The aspect-ratio of such connections is of order 50:1, compared to less than 2:1 for vias on a single silicon chip. This very high aspect ratio places increased demand on the performance of the etching process, of which a key parameter is the etching chemistry. This shrinking of device geometries also places more demand on the materials used in the construction of the device; requiring improved purity of the incoming materials so as to reduce the possibility of defects.

After creation of the transistors, they must be interconnected using a conductive metal. Historically, the metal wires were made of aluminum separated by $SiO_2$. Recently, aluminum has been replaced by copper as the interconnect material and low dielectric materials replaced $SiO_2$. This has resulted in increased performance by reducing the timing delay in the wiring.

Carbonyl sulfide (COS) has many uses, such as an intermediate product or as a fumigant, in the production of merceptants, urea, etc. COS is also considered important for plasma etching technology for semiconductor devices. However, in the presence of $H_2O$, carbonyl sulfide (COS) and $H_2S$ are known corrosion promoters towards copper. The result is the formation of CuS, $Cu_2S$, or CuO depending on the reacting species. Specifically, $H_2S$ has been found to be corrosive towards Cu both in the presence and absence of $H_2O$. This has been seen both at high concentrations of $H_2S$ and at trace levels. In addition, it has been found that COS in the presence of $H_2O$ is also corrosive towards Cu with similar corrosion properties as that of $H_2S$ in the presence of $H_2O$.

There are several known methods focusing on the synthesis of COS through different synthesis routes. However in all known methods, there are common impurities existing as a result of the COS synthesis depending on the type of the reactants being used in the process. The main impurities in COS are $CO_2$, $CS_2$ and $H_2S$ coming either from $CS_2$ source itself or produced during the course of the process, for example by the undesired hydrolysis of COS with $H_2O$. As discussed above, it is well known that the combination of $H_2O$ and $H_2S$ or COS cause corrosion to copper, which may be critical in electronics applications. It is rather difficult to remove $H_2S$ from COS since the two compounds have similarly volatilities, as shown in FIG. 1. Therefore, the major challenge in the COS purification process is to efficiently remove $H_2S$, as well as other impurities, using specifically adsorbents for high removal efficiency.

Several studies have been performed to remove sulfur-containing compounds, such as carbonyl sulfide (COS), hydrogen sulfide ($H_2S$), and $CS_2$, from the feedstocks used to prepare synthesis gas ("syngas") in an effort to prevent sulfur poisoning of the catalysts in the syngas preparation. Syngas is a gas mixture containing at least CO and $H_2$ that may be obtained from coal or alkane feedstocks, such as $CH_4$ or $CH_3CH_3$. Conventional methods to purify syngas feedstocks from these undesired impurities include chemical absorption using amines, metal sulfates, and metal oxides. See, e.g., Lee et al., Environ. Sci. Technol. 35 (11) (2001) 2352-2357 (disclosing that the most common means to remove acid gases such as $H_2S$ and $CO_2$ is adsorption by aqueous solutions of various alkanolamines); Mandal et al., Chemical Engineering Science 61 (2006) 5440-5447 (adsorption of $CO_2$ into 2-amino-2-methyl-1-proposal, MEA (monoethanolamine), and water); Maat et al., Separation Purification Technology 43 (2005) 183-197 (disclosing a method to selectively remove H2S over CO2 from gas streams using aqueous metal sulfate absorbent); Wang et al., Applied Surface Science 254 (2008) 5445-5451 (room temperature chemisorption of $H_2S$ on zinc oxide modified Al-substituted SBA-15); Miura et al., Ind. Eng. Chem. Res. 31 (1991) 415-419 (disclosing the use of iron oxide to simultaneously remove COS and $H_2S$ from coke oven gas); Wang et al., Water Air Soil Pollut 193 (2008) (disclosing $H_2S$ removal by mesoporous SBA-15 supported iron oxide).

These methods generally focus on removing $H_2S$ or the combination of $H_2S$ and COS to purify the feedstock for the syngas industry. Therefore, these methods generally do not clearly address how to efficiently remove $H_2S$ selectively over COS. Additionally, these methods do not address the purity levels required by the electronics industry.

Among these methods, metal oxides offer the clear advantages of efficiently removing $H_2S$ selectively over COS through metal oxide beds. See, e.g., U.S. Pat. No. 6,692,711 (disclosing that zinc oxide is more reactive towards $H_2S$ than COS). A main disadvantage with this method is that according to the reaction (for example), $H_2S+ZnO \Leftrightarrow ZnS+H_2O$, water is produced while sulfur is trapped in the zinc oxide bed. However, the $H_2O$ produced (depending on the amount of $H_2S$ being treated) may react with COS and form $H_2S$ again (for example), $COS+H_2O \Leftrightarrow H_2S+CO_2$.

A need remains to purify COS to levels suitable for use in the electronics industry.

SUMMARY

Disclosed herein are non-limiting embodiments of methods, apparatus and compounds which may be used in the manufacture of semiconductor, photovoltaic, LCD-TFT, or flat panel type devices.

Also disclosed is a method of producing pure COS suitable for use in the manufacture of semiconductor, photovoltaic, LCD-TFT, or flat panel type devices. A COS-containing stream is obtained and passed through at least one bed containing at least one adsorbent selected from the group consisting of a copper-free zinc oxide, 13X, and 4A, to remove $H_2S$. The resulting COS product has less than 200 ppm $H_2S$. The disclosed method may include one or more of the following aspects:

the copper-free zinc oxide adsorbent containing less than 10% w/w copper, preferably less than 2% w/w, and more preferably less than 0.1% w/w;

the copper-free zinc oxide having a the total zinc as zinc oxide between approximately 90% w/w and approximately 100% w/w;

the COS-containing stream having a space velocity in the range of approximately 60 to approximately 2000 $h^{-1}$, preferably in the range of approximately 500 to approximately 1500 $h^{-1}$;

the at least one bed having a temperature in the range of approximately 20° C. up to approximately 350° C., preferably between approximately 20° C. to approximately 35° C.;

the at least one bed having a pressure in the range of approximately 0 to approximately 500 psig;

prior to passing the COS-containing stream through the at least one adsorbent, passing the COS-containing stream through a cold trap to remove $H_2O$ and $CS_2$ and supply the COS-containing stream having less than 200 ppm $CS_2$;

after passing the COS-containing stream through the at least one adsorbent, passing the COS product through a cold trap to remove $CO_2$ and produce a COS product having less than 200 ppm $CO_2$;

passing the COS-containing stream through a second adsorbent;

the at least one bed comprising alternating layers of the at least one adsorbent and the second adsorbent;

the at least one bed comprising a layer of the at least one adsorbent and a layer of the second adsorbent;

the at least one bed comprising a mixture of the at least one adsorbent and the second adsorbent;

the mixture of the at least one adsorbent and the second adsorbent being homogeneous;

the second adsorbent being a zeolite; and the zeolite being selected from the group consisting of 3A, 4A, 13X, and combinations thereof.

Also disclosed is the COS product produced by the methods described above.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a vapor pressure versus temperature curve for the gases involved in the process; and FIG. 2A is a schematic showing a first embodiment of the method disclosed;

FIG. 2B is a schematic showing a second embodiment of the method disclosed;

FIG. 2C is a schematic showing a third embodiment of the method disclosed; and

FIG. 2D is a schematic showing a fourth embodiment of the method disclosed.

DETAILED DESCRIPTION OF PREFERRED EMBODIMENTS

Disclosed are processes to purify COS and remove $H_2S$ at high efficiency without hydrolyzing, adsorbing/chemisorbing or substantially removing the desired COS product. The disclosed processes provide for the efficient removal of $H_2S$ and recovery of COS, while eliminating the water produced.

In all of the methods disclosed, operation at high temperature, i.e. in the range of 50° C. to 150° C., needs to be avoided when water is present to prevent hydrolyzation of COS to $H_2S$ ($COS+H_2O \Leftrightarrow H_2S+CO_2$). The hydrolyzation reaction slows when the temperature is below approximately 30° C. or in an anhydrous environment. However, in certain embodiments, the temperature may range from approximately 20° C. up to approximately 350° C., preferably from approximately 20° C. to approximately 35° C.

In a first embodiment, as depicted in FIG. 2A, the COS-containing stream passes through at least one bed (or column) containing at least one adsorbent. One of ordinary skill in the art will understand that the prior art is replete with teachings of adsorbent beds and devices containing them.

As depicted in FIG. 2A, the COS-containing stream may originate from a cylinder. However, one of ordinary skill in the art will recognize that the COS-containing stream may also be obtained directly from any storage vessel, its source of manufacture, COS contaminant streams from syngas purification, or recycled from an application after use. Similarly, the resulting COS product may be provided in a cylinder, any storage vessel, or directly to the relevant application, such as plasma etching or deep trench formation. The COS-containing stream contains at least 90% v/v COS, preferably at least 95% v/v COS, and more preferably at least 98% v/v COS.

The COS-containing stream passes through the at least one bed at a space velocity in the range of approximately 60 $h^{-1}$ to approximately 2000 $h^{-1}$ (preferably approximately 500 $h^{-1}$ to approximately 1500 $h^{-1}$), temperature range of approximately 20° C. to approximately 350° C. (preferably approximately 20° C. to approximately 100° C. and more preferably approximately 20° C. to approximately 35° C.) and pressure range of approximately 0 psig to approximately 500 psig (preferably at or close to atmospheric pressure). However, one of ordinary skill in the art will recognize that the pressure utilized may differ from this range if necessary due to other applications performed in the entire purification process. As will be discussed in further detail with respect to the remaining embodiments, the COS-containing stream may also pass through a series of packed beds or columns to get rid of other impurities.

The adsorbent may be any size or shape. Preferably, the adsorbent is not in powder form, to prevent any clogging that may result from the sulfur accumulation. Additionally, the use of a powder adsorbent may cause undesirable pressure drops across the adsorption beds. Therefore, beads, pellets, or spheres are preferable forms for the adsorbent.

Preferably, the at least one adsorbent is copper-free zinc oxide. By copper-free, the zinc oxide contains less than 10% w/w copper, preferably less than 2% w/w, and more preferably less than 0.1% w/w. Preferably, the total zinc as zinc oxide should be between approximately 90% w/w and approximately 100% w/w. In tests using 2.5 mm spheres of copper-free zinc oxide having 92% total zinc as zinc oxide, the sulfur hydride ($H_2S$) content of the COS-containing stream was reduced from approximately 600 ppm to below the detection limits of the analyzer. The copper-free zinc oxide had a 1.5% w/w capacity for $H_2S$ removal. One of ordinary skill in the art will recognize that decreasing the percentage of zinc as zinc oxide will reduce the capacity for $H_2S$ removal.

Applicants discovered that a 70% zinc oxide/30% copper oxide mixture successfully removed $H_2S$ at room temperature to below the detection limits of the analyzer, but also decomposed some of the COS. Applicants believe that the copper reacts with the COS to produce additional $CO_2$, making the 70% zinc oxide/30% copper oxide mixture unacceptable for the purification of COS for the electronics industry.

The principle of the elimination of the sulfur hydride consists in the sulfurization of a metal oxide with $H_2O$ evolution: $ZnO+H_2S \Leftrightarrow ZnS+H_2O$. However, as mentioned previously, COS reacts with the water produced to create more impurities: $COS+H_2O \Leftrightarrow H_2S+CO_2$. In order to prevent $H_2O$ from reacting with COS and regenerating $H_2S$, the gaseous mixture may also pass through a second adsorbent, such as a desiccant (for instance, a zeolite, preferably having 3 angstrom (A) pore size, hereinafter referred to as 3A, and more preferably acid washed 3A, such as disclosed in U.S. Pat. No. 6,752,852), either in a consecutive fixed bed or in the same bed as the copper-free zinc oxide, to absorb moisture since 3A is known to absorb moisture effectively without trapping COS.

3A is suggested to remove moisture due its size selectivity and polarity. For example, the 3A material has pore size of 3 Å which is suitable for adsorption of $H_2O$ since $H_2O$ is the smallest molecule among COS and its impurities (COS, $CO_2$, $CS_2$, $H_2S$). Therefore, 3A selectively adsorbs water over the remaining molecules. Additionally, the polar nature of 3A helps it to adsorb the polar water molecule. One of ordinary skill in the art will recognize that other desiccants may also be used without departing from the teachings herein.

Applicants have also discovered, however, that passing the COS-containing stream through a bed containing copper-free zinc oxide does not result in a significant increase in $H_2O$ levels in the COS-containing gas mixture obtained. In fact, during the first 15 minutes of processing the COS-containing stream in the copper-free zinc oxide bed, the $H_2O$ content decreased to an almost negligible level. Therefore the use of copper-free zinc oxide alone is envisioned and one of the preferred embodiments disclosed herein.

Alternatively the COS-containing stream passes through a bed containing both the copper-free zinc oxide and the second adsorbent, such as a dessicant. Most preferably, the copper-free zinc oxide and the second adsorbent are homogeneously mixed in the bed.

Another configuration is to prepare a packed column by placing the copper-free zinc oxide and molecular sieve material (preferably 3A) through layer by layer fashion by perhaps placing a glass wool in between them, or first the zinc oxide followed by molecular sieve or mixing the zinc oxide and the molecular sieve and filling the column randomly or homogeneously and perform the purification process at conditions similar to those stated previously.

The COS-containing stream may alternatively pass through at least one bed containing a molecular sieve adsorbent, rather than the copper-free zinc oxide adsorbent. Size differences, shapes, and polarities play a big role in the selectivity of molecular sieves toward various molecules. The molecular sieves may also be combined with a desiccant in the manner described above with respect to the copper-free zinc oxide.

In the first alternative, the COS-containing stream passes through at least one bed containing 13X, a molecular sieve having for example the formula $NaO.Al_2O_3.2.5SiO_2.XH_2O$. One of ordinary skill in the art will recognize that the formula for the 13X molecular sieve composition may differ among manufactures, but still be encompassed by the present disclosure. The $H_2S$ content of the COS-containing stream was reduced from approximately 600 ppm to below the detection limits of the analyzer using 1.6 to 2.5 mm beads of 13X molecular sieve.

In another alternative, the COS-containing stream passes through at least one bed containing 4A, a molecular sieve having for example the linear formula $NaO.Al_2O_3.SiO_2.XH_2O$. One of ordinary skill in the art will recognize that the formula for the 4A molecular sieve composition may differ among manufactures, but still be encompassed by the present disclosure. The $H_2S$ content of the COS-containing stream was reduced from approximately 600 ppm to below the detection limits of the analyzer using 1.6 mm pellets of the 4A molecular sieve. 4A may also be effective in simultaneously removing $CO_2$.

In a second embodiment, as depicted in FIG. 2B, the COS-containing stream travels with other impurities such as $H_2O$, $CO_2$, $H_2S$, and $CS_2$ into a cold trap to remove $H_2O$ and $CS_2$ from the COS-containing stream. The cold trap uses cryoseparation to remove the $H_2O$ and $CS_2$ from the COS-containing stream due to the differences in volatility between the $H_2O$ (bp=100° C.), $CS_2$ (bp=46° C.) and the remaining components of the COS-containing stream (bp COS=−50° C.; by $H_2S$=−60° C.; by $CO_2$=−78° C.). Suitable cold traps include, but are not limited to, any apparatus that controls the temperature of the COS-containing stream, a distillation column, a flash pot (or single distillation tray), or any other cryoseparation processes. One of ordinary skill in the art will recognize that this cryoseparation step may be performed by one or more than one cold trap without departing from the teachings herein. Preferably, at atmospheric pressure, the temperature range of the cold trap is between approximately −40° C. to −30° C., turning the $H_2O$ and $CS_2$ into liquids and leaving the COS, $H_2S$, and $CO_2$ in gaseous form. One or ordinary skill in the art will recognize that commensurate changes in pressure and temperature may still provide efficient separation. Preferably, after passing through the cold trap, the COS-containing stream contains less than 200 ppm, more preferably less than 150 ppm, and even more preferably less than 20 ppm $CS_2$.

Afterwards, the COS-containing stream passes through a metal oxide bed which, as in the first embodiment, includes a zinc oxide, 13X, or 4A adsorbent alone or in combination with a desiccant, with space velocity in the range of approximately 60 $h^{-1}$ to approximately 2000 $h^{-1}$ (preferably approximately 500 V to approximately 1500 $h^{-1}$), temperature range of approximately 20° C. to approximately 350° C. (preferably approximately 20° C. to approximately 100° C. and more preferably approximately 20° C. to approximately 35° C.) and pressure range of approximately 0 psig to approximately 500 psig to remove $H_2S$ impurities ranging from 100 ppm to 6% v. Once again, one of ordinary skill in the art will recognize that the pressure utilized may differ from this range if necessary due to other applications performed in the entire purification process. This results in a dramatic reduction of $H_2S$ content below 200 ppm, preferably below 100 ppm, and more preferably below 20 ppm.

After removal of the $H_2O$, $CS_2$, and $H_2S$, the COS-containing stream travels into a cold trap to remove $CO_2$ from the COS-containing stream. The cold trap uses cryoseparation to liquefy COS and remove the $CO_2$ vapor due to the differences in volatility between the COS (bp=−50° C.) and the $CO_2$ (bp=−78° C.). Suitable cold traps include, but are not limited to, any apparatus that controls the temperature of the COS-containing stream, a distillation column, a flash pot (or single distillation tray), or any other cryoseparation processes. One of ordinary skill in the art will recognize that this cryoseparation step may be performed by one or more than one cold trap without departing from the teachings herein. Preferably, at atmospheric pressure, the temperature range of the cold trap is between approximately −72° C. and approximately −78° C. One or ordinary skill in the art will recognize that commensurate changes in pressure and temperature may still provide efficient separation. Preferably, after passing through the cold trap, the COS-containing stream contains less than 200 ppm, more preferably less than 150 ppm, and even more preferably less than 25 ppm $CO_2$.

Alternatively, to remove $CO_2$, the COS-containing stream may pass through a 4A packed bed column to absorb $CO_2$, effectively, again without trapping COS gas. As discussed with regard to the first embodiment, the 4A zeolite may be in the same bed as the copper-free zinc oxide or the 13A zeolite or in a separate bed. Additionally the 4A zeolite may be mixed, homogenously mixed, or layered within the same bed as the other adsorbent. In another alternative, both the 4A zeolite and cold trap may be used.

Preferably, the resulting COS product contains less than 200 ppm, more preferably less than 150 ppm, and even more preferably less than 20 ppm of each of $H_2S$, $CS_2$, $CO_2$, and $H_2O$. However, one of ordinary skill in the art will recognize that the electronics industry is highly concerned with reduction of the $H_2O$ and $H_2S$ impurities and, therefore, that higher impurity levels of $CS_2$ and $CO_2$ may be acceptable in some applications. Therefore, depending upon the initial impurity levels of the COS-containing stream, one of ordinary skill in the art may choose to utilize copper-free ZnO alone to remove $H_2S$ and $H_2O$ or 4A alone to remove $H_2S$ and $CO_2$ or 13X alone to remove $H_2S$ as depicted in FIG. 2A. Alternatively, in order to achieve the highest quality COS product, one of ordinary skill in the art may combine the $CS_2$ cold trap, the ZnO/4A/13X/3A adsorbent, and the $CO_2$ cold trap as in FIG. 2B. One of ordinary skill in the art may also have reason to utilize a cold trap and the ZnO/4A/13X/3A adsorbent as in FIG. 2C (low $CS_2$ applications) or the ZnO/4A/13X/3A adsorbent and a cold trap as in FIG. 2D (low $CO_2$ applications).

The resulting COS product may be used for plasma etching or deep trench formation. Plasma etching is a process used to pattern wafers, with deep trench formation being a specific plasma etch process.

EXAMPLES

The following non-limiting examples are provided to further illustrate embodiments of the invention. However, the examples are not intended to be all inclusive and are not intended to limit the scope of the inventions described herein.

A COS-containing stream having 98.53% COS, 6891 ppm $CS_2$, 6082 ppm $N_2$, 972 ppm $CO_2$, and 671 ppm $H_2S$ underwent the purification steps listed in Table 1. The purified mixture was analyzed using a Varian CP-3800 gas chromatographer fitted with a bonded polystyrene-divinylbenzene based column and a He carrier flow rate of 30 sccm. FTIR allowed real time monitoring of concentrations of key impurities including $H_2O$, $CO_2$, and $CS_2$. The results are contained in Table 1 below.

TABLE 1

| Purification Step | Results |
|---|---|
| $CS_2$ Cold Trap | Reduced $CS_2$ |
| Cu-free ZnO | Reduced $H_2S$ and $H_2O$, with slight generation of $CO_2$ |
| 70% ZnO/30% CuO | Reduced COS and $H_2S$ with significant generation of $CO_2$ |
| CuO/MgO | Reduced COS and $H_2S$ with significant generation of $CO_2$ |
| 3A | Did not reduce $CS_2$, $H_2S$, or $CO_2$ |
| 4A | Reduced $H_2S$ and $CO_2$ |
| 5A | Temporarily reduced $H_2S$ and $CS_2$ |
| $CO_2$ Cold Trap | Reduced $CO_2$ |
| $CS_2$ Cold Trap and 13X | Reduced $CS_2$ and $H_2S$ |
| $CS_2$ Cold Trap, Cu-free ZnO, $CO_2$ Cold Trap | Reduced $CS_2$, $H_2S$, $H_2O$, and $CO_2$ |

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A method of producing pure COS, the method comprising:
   a) obtaining a COS-containing stream;
   b) passing the COS-containing stream through at least one bed containing at least one adsorbent selected from the group consisting of a zinc oxide containing less than 10% w/w copper, 13X, and 4A, to remove $H_2S$; and
   c) producing a COS product having less than 200 ppm $H_2S$.

2. The method of claim 1, wherein the zinc oxide adsorbent contains less than 2% w/w copper.

3. The method of claim 1, wherein the zinc oxide adsorbent has a total zinc as zinc oxide between approximately 90% w/w and approximately 100% w/w.

4. The method of claim 1, wherein the COS-containing stream has a space velocity in the range of approximately 60 to approximately 2000 $h^{-1}$.

5. The method of claim 1, wherein the at least one bed has a temperature in the range of approximately 20° C. up to approximately 350° C.

6. The method of claim 1, wherein the at least one bed has a pressure in the range of approximately 0 to approximately 500 psig.

7. The method of claim 1, further comprising, prior to passing the COS-containing stream through the at least one adsorbent, passing the COS-containing stream through a cold trap to remove $H_2O$ and $CS_2$ and supply the COS-containing stream having less than 200 ppm $CS_2$.

8. The method of claim 1, further comprising, after passing the COS-containing stream through the at least one adsorbent, passing the COS product through a cold trap to remove $CO_2$ and produce a COS product having less than 200 ppm $CO_2$.

9. The method of claim 1, further comprising passing the COS-containing stream through a second adsorbent.

10. The method of claim 9, wherein the at least one bed comprises alternating layers of the at least one adsorbent and the second adsorbent.

11. The method of claim 9, wherein the at least one bed comprises a layer of the at least one adsorbent and a layer of the second adsorbent.

12. The method of claim 9, wherein the at least one bed comprises a mixture of the at least one adsorbent and the second adsorbent.

13. The method of claim 12, wherein the mixture is homogeneous.

14. The method of claim 9, wherein the second adsorbent is a zeolite.

15. The method of claim 14, wherein the second adsorbent is selected from the group consisting of 3A, 4A, 13X, and combinations thereof.

16. A method of producing pure COS, the method comprising:
   a) obtaining a COS-containing stream;
   b) passing the COS-containing stream through at least one bed containing at least one adsorbent and a second adsorbent, the at least one adsorbent selected from the group consisting of a copper-free zinc oxide, 13X, and 4A, and the second absorbent being a zeolite selected from the group consisting of 3A, 4A, 13X, and combinations thereof; and
   c) producing a COS product having less than 200 ppm $H_2S$.

17. The method of claim 16, wherein the at least one bed comprises alternating layers of the at least one adsorbent and the second adsorbent.

18. The method of claim 16, wherein the at least one bed comprises a mixture of the at least one adsorbent and the second adsorbent.

19. The method of claim 16, further comprising, prior to passing the COS-containing stream through the at least one bed, passing the COS-containing stream through a cold trap to remove $H_2O$ and $CS_2$ and produce the COS-containing stream having less than 200 ppm $CS_2$.

20. The method of claim 17, further comprising, after passing the COS-containing stream through the at least one bed, passing the COS product through a cold trap to remove $CO_2$ and produce a COS product having less than 200 ppm $CO_2$.

* * * * *